United States Patent [19]

Nagasaki

[11] 4,432,236

[45] Feb. 21, 1984

[54] SIGNAL PROCESSING CIRCUIT OF ULTRASONIC DIAGNOSTIC APPARATUS

[75] Inventor: Tatsuo Nagasaki, Tokyo, Japan

[73] Assignee: Olympus Optical Co., Ltd., Tokyo, Japan

[21] Appl. No.: 331,125

[22] Filed: Dec. 15, 1981

[51] Int. Cl.³ ............................................. G01N 29/00
[52] U.S. Cl. ...................................... 73/631; 128/660
[58] Field of Search .................. 128/660, 661; 73/631, 73/618–620, 625–626, 900

[56] References Cited

U.S. PATENT DOCUMENTS

| | | | |
|---|---|---|---|
| 4,043,181 | 8/1977 | Nigam | 73/631 X |
| 4,145,741 | 3/1979 | Nappin | 73/631 X |
| 4,205,555 | 6/1980 | Hashiguchi | 73/631 X |
| 4,248,091 | 2/1981 | Hasiguchi | 73/631 |
| 4,289,140 | 9/1981 | Carpenter et al. | 73/631 X |
| 4,327,738 | 5/1982 | Green et al. | 128/660 |

*Primary Examiner*—Kyle L. Howell
*Assistant Examiner*—Francis J. Jaworski
*Attorney, Agent, or Firm*—Frishauf, Holtz, Goodman & Woodward

[57] ABSTRACT

An echo signal irradiated from an ultrasonic scanner and reflected back from a subject under examination is amplified by a logarithm amplifier and is amplitude-detected by a detector. An adder adds to the detected echo signal an STC voltage, a gain control voltage and a gain control feedback voltage. The gain-controlled echo signal from the adder is input to a multiplier and multiplied by a dynamic control voltage and a negative feedback gain control voltage. The negative feedback gain control voltage is obtained by integrating the output from the multiplier and inverting and amplifying the obtained signal.

8 Claims, 9 Drawing Figures

FIG. 6
FIG. 9
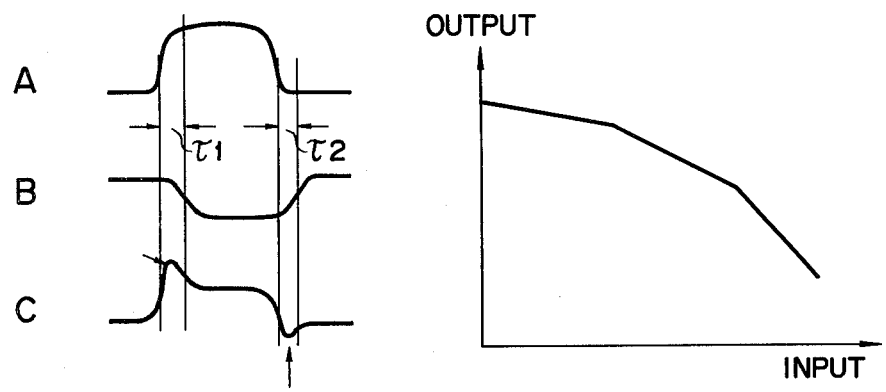
FIG. 8
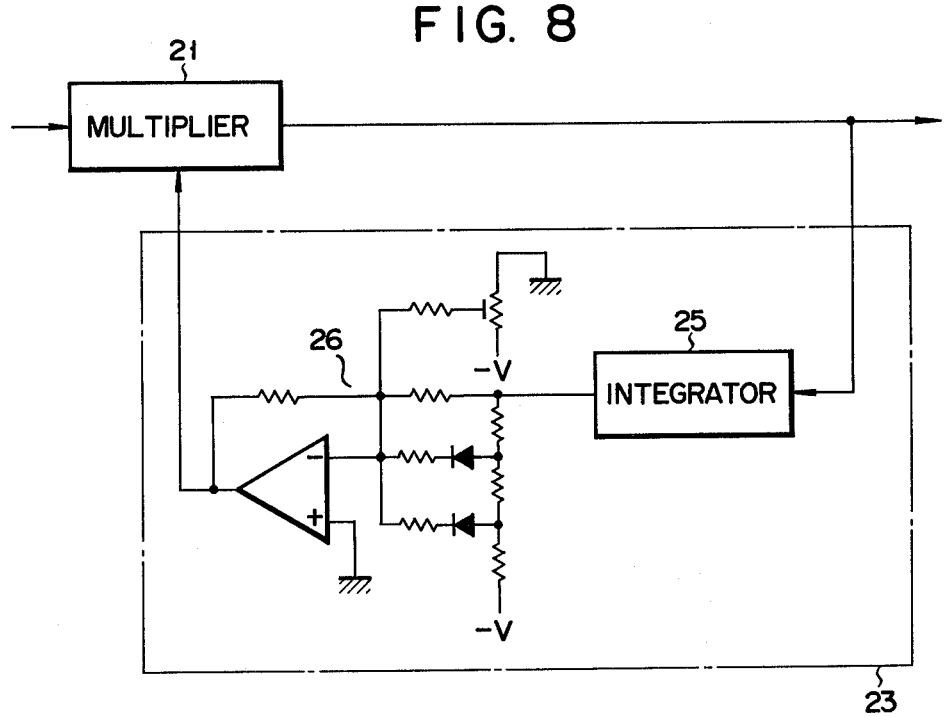

SIGNAL PROCESSING CIRCUIT OF ULTRASONIC DIAGNOSTIC APPARATUS

BACKGROUND OF THE INVENTION

The present invention relates to a signal processing circuit for an ultrasonic diagnostic apparatus.

An ultrasonic diagnostic apparatus is so constructed that a living body is irradiated with an ultrasonic beam irradiated from an ultrasonic probe, an echo signal reflected from the living body is received and processed, and a sector image of the living body obtained is displayed on a display. The ultrasonic echo signal has a great level difference such as 60 dB. For example, if the small-amplitude signal component has an amplitude of level 1, the large-amplitude signal component has an amplitude of level 1,000. These signal components have an exponential distribution in amplitude. Furthermore, when the ultrasonic beam propagates within the living body, it is attenuated by the difference in the acoustic impedance which is, in turn, caused by the density of the body tissue, and the ratio of the signal components of the ultrasonic echo signal becomes as great as 120 dB. The attenuation characteristics also have an exponential distribution. Such an ultrasonic echo signal is amplified by a logarithmic amplifier, processed by a signal processing circuit, supplied to a monitor display and displayed on the monitor display as a sector image. During this process, the signal processing circuit performs gain control and dynamic range control of the signal to control the gradation and dynamic range. In such control operations, setting values significantly change according to the part of the body under examination or from one patient to another. Therefore, the setting values must be adjusted for every control operation. The brightness signal, i.e., the echo signal for one transmission and reception operation includes the signal component of large amplitude and the signal component of small amplitude. For this reason, even if the operator has good knowledge of the principle of the dynamic range control, an excellent sector image or a sector image of required quality may not be obtained. This is disadvantageous for simplicity of operation, speed of examination, and reliability of examination results. In order to compensate for these defects, an automatic gain control (AGC) has been adopted. However, this does not sufficiently eliminate these defects. In addition to this, the AGC has an effect of emphasizing the contour. Therefore, when the effect of the AGC is too intense, the contour is emphasized too much, degrading the image quality. Furthermore, the AGC cancels the signal component of small amplitude mixed with the signal component of large amplitude. Therefore, when the effect of the AGC is too intense, the dynamic range is narrowed.

SUMMARY OF THE INVENTION

It is an object of the present invention to provide a signal processing circuit for an ultrasonic diagnostic apparatus which automatically corrects the dynamic range in correspondence with changes in the level of an echo signal so that the operability, speed of examination, and reliability may be improved.

In order to achieve the above object, there is provided according to the present invention an ultrasonic diagnostic apparatus comprising a dynamic range control circuit for controlling the dynamic range of an echo signal from an ultrasonic scanner, and a dynamic range control signal generator which integrates the output from the dynamic range control circuit for negative feedback to the dynamic range control circuit in real time.

BRIEF DESCRIPTION OF THE DRAWINGS

FIG. 6 is a timing chart for explaining an ADC voltage generator shown in FIG. 2;

FIG. 8 is a circuit diagram showing a modification of the ADC voltage controller; and FIG. 9 is a graph showing the characteristics of an operational amplifier circuit of the ADC voltage generator shown in FIG. 8.

DETAILED DESCRIPTION OF THE PREFERRED EMBODIMENTS

Figure 1:
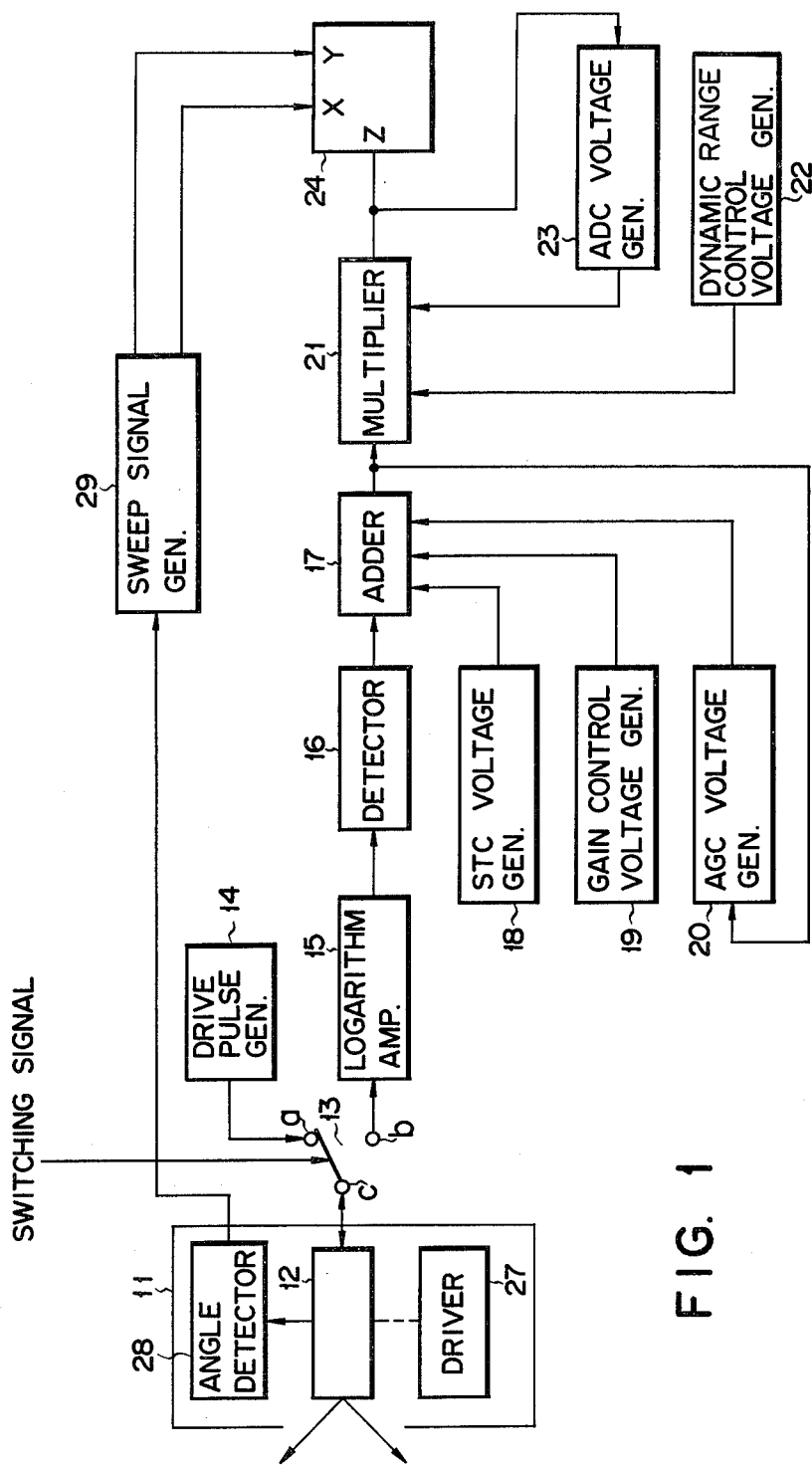
FIG. 1 is a block diagram of an ultrasonic diagnostic apparatus having a signal processing circuit according to an embodiment of the present invention.
Figure 2:
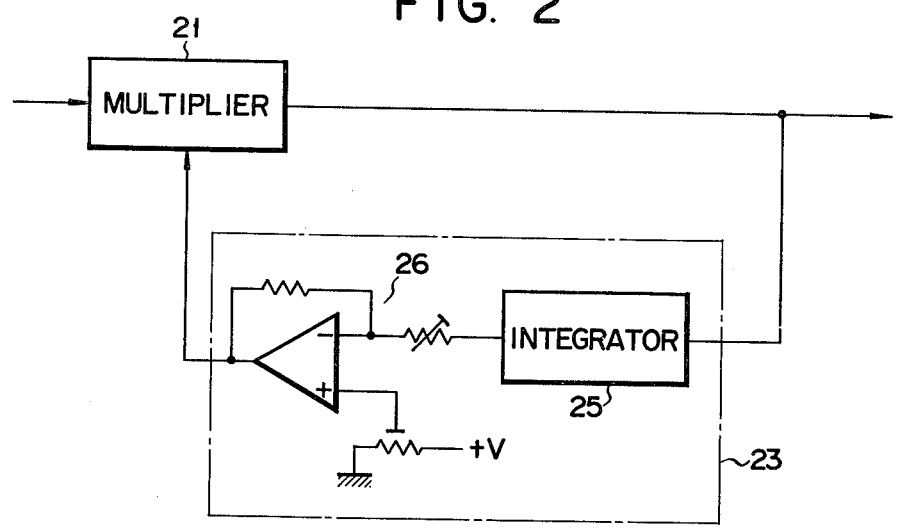
FIG. 2 is a circuit diagram of a dynamic range control circuit shown in FIG. 1.

Referring to FIG. 1, an ultrasonic transducer 12 of an ultrasonic probe, i.e., an ultrasonic scanner 11, is connected to a contact c of a transmission/reception changeover switch 13. A contact a of the switch 13 is connected to the output terminal of a drive pulse generator 14 while a contact b of the switch 13 is connected to the input terminal of a logarithm amplifier 15. The output terminal of the logarithm amplifier 15 is connected to the input terminal of a detector 16, the output terminal of which is connected to an echo signal input terminal of an adder 17. To the other input terminals of the adder 17 are connected the output terminals of an STC voltage generator 18, a gain control voltage generator 19, and an AGC voltage generator 20, respectively. The STC voltage generator 18 generates a sensitivity time control (STC) voltage for correcting the attenuation of the ultrasonic beam. The gain control voltage generator 19 generates a voltage for controlling the gain of the echo signal. The set voltages of these generators 18 and 19 may be manually controlled. The output terminal of the adder 17 is connected to an echo signal input terminal of a multiplier 21 as well as to the input terminal of the AGC voltage generator 20. To the other input terminals of the multiplier 21 are connected the output terminals of a dynamic range control voltage generator 22 and an automatic dynamic control (ADC) voltage generator 23, the voltages output therefrom being manually adjustable. The output terminal of the multiplier 21 is connected to a terminal Z of a cathode ray tube (CRT) display 24 as well as to the input terminal of the ADC voltage generator 23. The ADC voltage generator 23 has, as shown in FIG. 2, an integrator 25 connected to the output terminal of the multiplier 21, and an operational amplifier circuit 26 connected to the output terminal of the integrator 25. The output terminal of the operational amplifier circuit 26 is connected to an input terminal of the multiplier 21.

The ultrasonic transducer 12 is driven by a driver 27 which comprises, for example, a motor or a galvanometric device. The rotational angle of the ultrasonic transducer 12 is detected by an angle detector 28. The output terminal of the angle detector 28 is connected to the input terminal of a sweep signal generator 29, X and Y signal output terminals of which are connected to input terminals X and Y of the CRT display 24, respectively.

The mode of opertion of the ultrasonic diagnostic apparatus of the configuration as described above will now be described.

Figure 5:
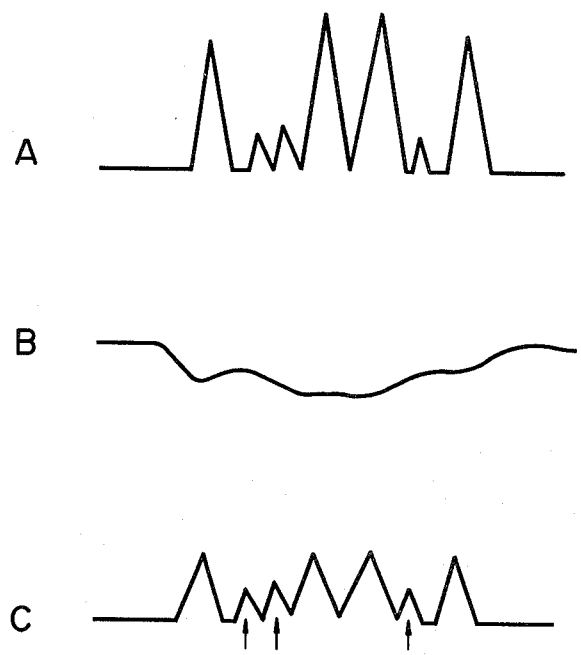
FIG. 5 is a timing chart for explaining the operation of the dynamic range control.
Figure 3:
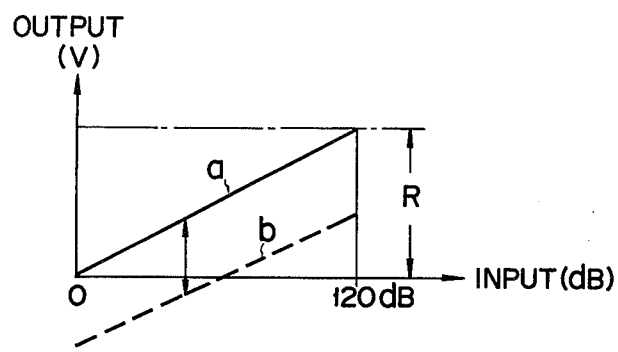
FIG. 3 is a graph showing the gain control characteristics.
Figure 4:
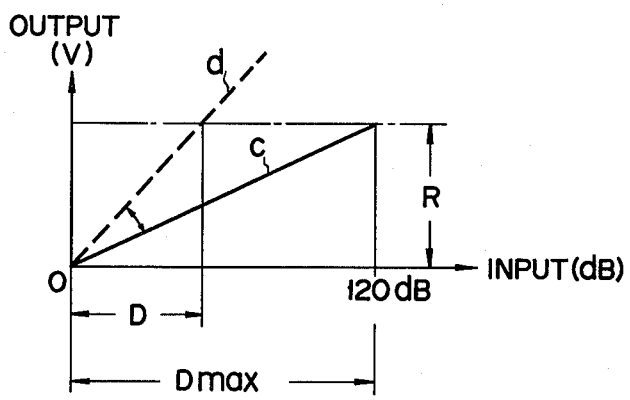
FIG. 4 is a graph showing the dynamic range control characteristics.

When the ultrasonic transducer 12 of the ultrasonic scanner 11 is driven by the driver 27, and a drive pulse is applied to the ultrasonic transducer 12 from the drive pulse generator 14 through the switch 13, an ultrasonic beam is irradiated from the ultrasonic transducer 12 to a subject under examination, such as a living body. An echo reflected from the living body is converted to an echo signal by the ultrasonic transducer 12. In this case, since the switch 13 is switched to the side of the contact b by a switching signal, the echo signal is applied to the input terminal of the logarithm amplifier 15 through the switch 13. The echo signal amplified by the logarithm amplifier 15 is input to the detector 16 to be amplitude-detected. The echo signal from the detector 16 is input to the adder 17. At the adder 17, the STC voltage output from the STC voltage generator 18 and the gain control voltage from the gain control voltage generator 19 are added to the echo signal according to the relation $\log AX = \log A + \log X$. To the sum obtained in this manner is also added a feedback voltage output from the AGC voltage generator 20 as an auxiliary means. By means of these addition operations, gain control of the echo signal is performed as shown by the input/output characteristic curve shown in FIG. 3. Thus, the gain is controlled from a gain a to a gain b. Referring to FIG. 3, symbol R represents the range in which the echo signal may be displayed. The gain-controlled echo signal is output from the adder 17 as a video signal A (FIG. 4) to be input to the multiplier 21. The multiplier multiplies the video signal A by the voltage output from the dynamic range control voltage generator 22 and an ADC voltage B output from the ADC voltage generator 23. In this manner, the dynamic range of the video signal is controlled. The control of the dynamic range is equivalent to changing the slope of the input/output characteristic curve c in FIG. 4. In this dynamic range control, the video signal A is multiplied by the negative feedback voltage B, that is, the ADC voltage B output from the ADC voltage generator 23 as shown in FIG. 5. The ADC voltage B is obtained by integrating an output C from the multiplier 21 by the integrator 25 for averaging, inverting and amplifying the obtained result by the operational amplifier circuit 26, and adding a suitable DC voltage to the obtained voltage. When the ADC voltage B is multiplied by the video signal A, the video signal A is positively compressed according to the signal level. That is, the signal component of high level of the video signal A is significantly attenuated while the signal component of low level is not cancelled. The compressed video signal is output from the multiplier 21 as the output signal C. The multiplier 21 comprises a multiplier of excellent linear characteristics in order to perform uniform quantization of the dynamic range with respect to the control voltage. The integrator 25 comprises a general low-pass filter. The frequency components and the dynamic range of the video signal may be controlled by changing the cut-off frequency and the cut-off characteristics of this filter. For example, when the cut-off frequency of the integrator 25 is set to be relatively high, the video signal A is compressed in real time without cancelling the echo signal component (indicated by arrows) of low level to widen the dynamic range since the ADC voltage B is negatively fed back to the video signal A. The integrator 25 attenuates the amplitude of the signal component of higher cut-off frequency as shown in FIG. 6A, resulting in time delays $\tau1$ and $\tau2$. However, when the ADC signal as shown in FIG. 6B is fed back to the input signal, the high frequency component is amplified to emphasize the contour of the echo image according to the delay times $\tau1$ and $\tau2$ to produce the output signal C. When the automatic dynamic control is performed for the echo signal corresponding to one scanning line or one frame, the cut-off frequency of the integrator 25 is set to be low according to the scanning range. Then, the signal for one scanning line or one frame is integrated, and an integrated signal is stored in a memory. The signal stored in the memory is read out in synchronism with the next scanning signal or the next frame signal and is multiplied by the new video signal, so that compression of the video signal in units of scanning lines or frames may be performed.

Figure 7:
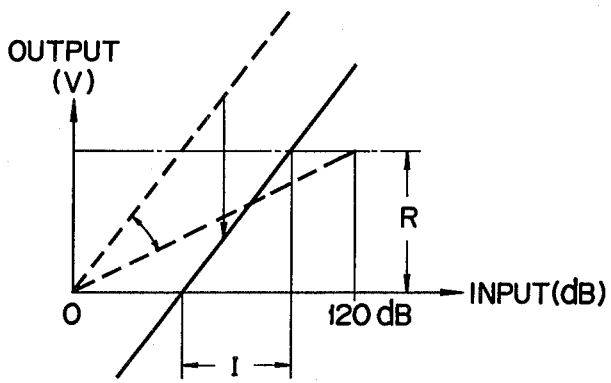
FIG. 7 is a graph showing the display level range when the echo signal is subjected to gain control and dynamic range control.

When the dynamic range control is performed in the manner as described above and the output signal C is input to the terminal Z of the CRT display 24, the output signal C is displayed on the display 24 by a sweep signal output from the sweep signal generator 29. When the video signal is displayed on the display 24, the image within input range I which is determined by the gain control and the dynamic range control, as shown in FIG. 7, is displayed.

FIG. 8 shows a modification of an ADC voltage generator 23. With this ADC voltage generator 23, the operational amplifier circuit 26 of nonlinear input/output characteristics as shown in FIG. 9 is used. With the ADC voltage generator 23, the compression rate of the video signal is further increased, further widening the dynamic range.

In summary, according to the present invention, the video signal (brightness signal) to be supplied to the display is integrated and negatively fed back, so that an image an echo signal of wider range and within a set dynamic range may be displayed. Therefore, even when the part under examination or the subject changes, ultrasonic scanning examination may be performed quickly and with reliability upon simple operation.

In the embodiment described above, the present invention is applied to a mechanical sector scan system. However, the present invention may be similarly applied to an electrical linear scan system.

What is claimed is:

1. A signal processing circuit for an ultrasonic diagnostic apparatus, comprising:
   means for detecting an echo signal from ultrasonic scanning means and for providing a detected echo signal output;
   gain-controlling means connected to said detecting means for controlling the level of gain provided an echo signal detected by said detecting means and for providing a corresponding gain-controlled echo signal output;
   dynamic range control means connected to said gain-controlling means and including means for generating a dynamic range control voltage and a multiplier for multiplying the gain-controlled echo signal output from said gain-controlling means by the dynamic range control voltage and a negative feedback voltage to provide a compressed output signal; and feedback means connected to said dynamic range control means for producing the negative feedback voltage, said feedback means including means for sequentially integrating, inverting and amplifying the output signal from said dynamic range control means to obtain the negative feedback voltage and to feed back said voltage to said dynamic control means.

2. A signal processing circuit according to claim 1, wherein said feedback means comprises an integrator for integrating the output signal from said dynamic range control means and providing an integrated output, and an operational amplifier circuit for inverting and for amplifying the integrated output from said integrator.

3. A signal processing circuit according to claim 2, wherein said operational amplifier circuit is operative to add a DC voltage to the integrated output.

4. A signal processing circuit according to claim 3, wherein said operational amplifier circuit has nonlinear input-output characteristics.

5. A signal processing circuit according to claim 2, wherein said operational amplifier circuit has nonlinear input-output characteristics.

6. A signal processing circuit according to claim 1, wherein said dynamic range control means is operative to subject an echo signal output corresponding to one scanning line to dynamic range control.

7. A signal processing circuit according to claim 1, wherein said dynamic range control means is operative to subject an echo signal output corresponding to one frame to dynamic range control.

8. A signal processing circuit according to claim 1, wherein said gain-controlling means includes means for generating a sensitivity time control voltage, means for generating a gain control voltage, means for generating an AGC feedback voltage and an adder for adding the echo signal output from said detecting means to the sensitivity time control voltage, the gain control voltage and the AGC feedback voltage.

* * * * *